(12) United States Patent
Jang et al.

(10) Patent No.: US 9,802,826 B2
(45) Date of Patent: Oct. 31, 2017

(54) APPARATUS FOR PRODUCING SILICON NANOPARTICLE USING INDUCTIVE COUPLED PLASMA

(71) Applicant: KOREA INSTITUTE OF ENERGY RESEARCH, Daejeon (KR)

(72) Inventors: Bo-Yun Jang, Daejeon (KR); Joon-Soo Kim, Daejeon (KR); Hee-Eun Song, Incheon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/039,206

(22) PCT Filed: Nov. 25, 2013

(86) PCT No.: PCT/KR2013/010729
§ 371 (c)(1),
(2) Date: May 25, 2016

(87) PCT Pub. No.: WO2015/076441
PCT Pub. Date: May 28, 2015

(65) Prior Publication Data
US 2016/0362302 A1 Dec. 15, 2016

(51) Int. Cl.
*C01B 33/029* (2006.01)
*B01J 19/08* (2006.01)
*C01B 33/021* (2006.01)

(52) U.S. Cl.
CPC ........... *C01B 33/029* (2013.01); *B01J 19/088* (2013.01); *C01B 33/021* (2013.01); *B01J 2219/0869* (2013.01); *B01J 2219/0871* (2013.01); *B01J 2219/0883* (2013.01); *B01J 2219/0894* (2013.01); *B01J 2219/1203* (2013.01); *C01P 2004/64* (2013.01)

(58) Field of Classification Search
CPC .... C01B 33/029; C01B 33/021; B01J 19/088; B01J 2219/0869; B01J 2219/0871; B01J 2219/0883; B01J 2219/0894; B01J 2219/1203; C01P 2004/64
USPC ....................................................... 428/402
See application file for complete search history.

(56) References Cited

U.S. PATENT DOCUMENTS

| 6,544,333 | B2 * | 4/2003 | Keck ...................... C23C 16/24 117/200 |
| 7,793,612 | B2 * | 9/2010 | Guskov ............... C03B 37/0183 118/715 |
| 7,816,269 | B2 * | 10/2010 | Aslami .................. C23C 16/24 422/186 |
| 7,858,158 | B2 * | 12/2010 | Aslami .................. C23C 16/24 427/457 |
| 8,377,205 | B2 * | 2/2013 | Jang ...................... B01J 19/088 117/108 |
| 8,992,848 | B2 * | 3/2015 | Darragh ................ B01J 19/087 204/164 |

FOREIGN PATENT DOCUMENTS

| KR | 10-2010-0091554 | * | 8/2010 |
| KR | 10-2010-0091554 A | | 8/2010 |
| KR | 10-2011-0121484 | * | 11/2011 |
| KR | 10-2011-0121484 A | | 11/2011 |
| KR | 10-2013-0014529 | * | 2/2013 |
| KR | 10-2013-0014529 A | | 2/2013 |
| WO | 2008/008098 A2 | | 1/2008 |
| WO | WO2008-008098 | * | 1/2008 |

* cited by examiner

Primary Examiner — Leszek Kiliman
(74) Attorney, Agent, or Firm — Baker & Hostetler LLP

(57) ABSTRACT

An apparatus for producing silicon nanoparticles using ICP includes a gas supply part in which first and second pipes for introducing a respective first and second gas into the plasma reactor therethrough are arranged alternately, the first pipes extending from an inlet of the reactor to a plasma initiation region; a plasma reaction part having an ICP coil wound therearound in which the particles are formed as the gases introduced through the respective pipes undergo a plasma reaction; and a collection part for collecting the particles. The apparatus can fully mix the gases introduced through the first gas supply pipes, thus allowing for uniform plasma reaction between the first and second gas, minimizing plasma expansion to increase plasma density within short retention time, easily controlling the size distribution by quenching and capturing nanoparticles, and improving the production yield by preventing the secondary aggregation of particles with cooling gas.

13 Claims, 20 Drawing Sheets

FIG.2

| ICP COIL WIDTH (W) (cm) | 5 | 5 | 5 | 5 | 10 | 10 | 10 | 10 | 10 | 10 | 15 | 15 | 15 | 15 | 15 | 15 | 15 | 15 |
|---|---|---|---|---|---|---|---|---|---|---|---|---|---|---|---|---|---|---|
| DISTANCE FROM INLET OF FIRST GAS SUPPLY PIPE TO IPC COIL (L) (cm) | 0 | 1 | 2 | 3 | 0 | 1 | 2 | 3 | 4 | 5 | 0 | 1 | 2 | 3 | 4 | 5 | 6 | 7 |
| L/W | 0.0 | 0.2 | 0.4 | 0.6 | 0.0 | 0.1 | 0.2 | 0.3 | 0.4 | 0.5 | 0.0 | 0.1 | 0.1 | 0.2 | 0.3 | 0.3 | 0.4 | 0.5 |
| PLASMA PATTERN | ○ | ○ | △ | × | ○ | ○ | ○ | ○ | △ | × | ○ | ○ | ○ | ○ | ○ | △ | × | × |

○: Stable dense plasma, △: Unstable dense plasma, ×: Unstable extended plasma

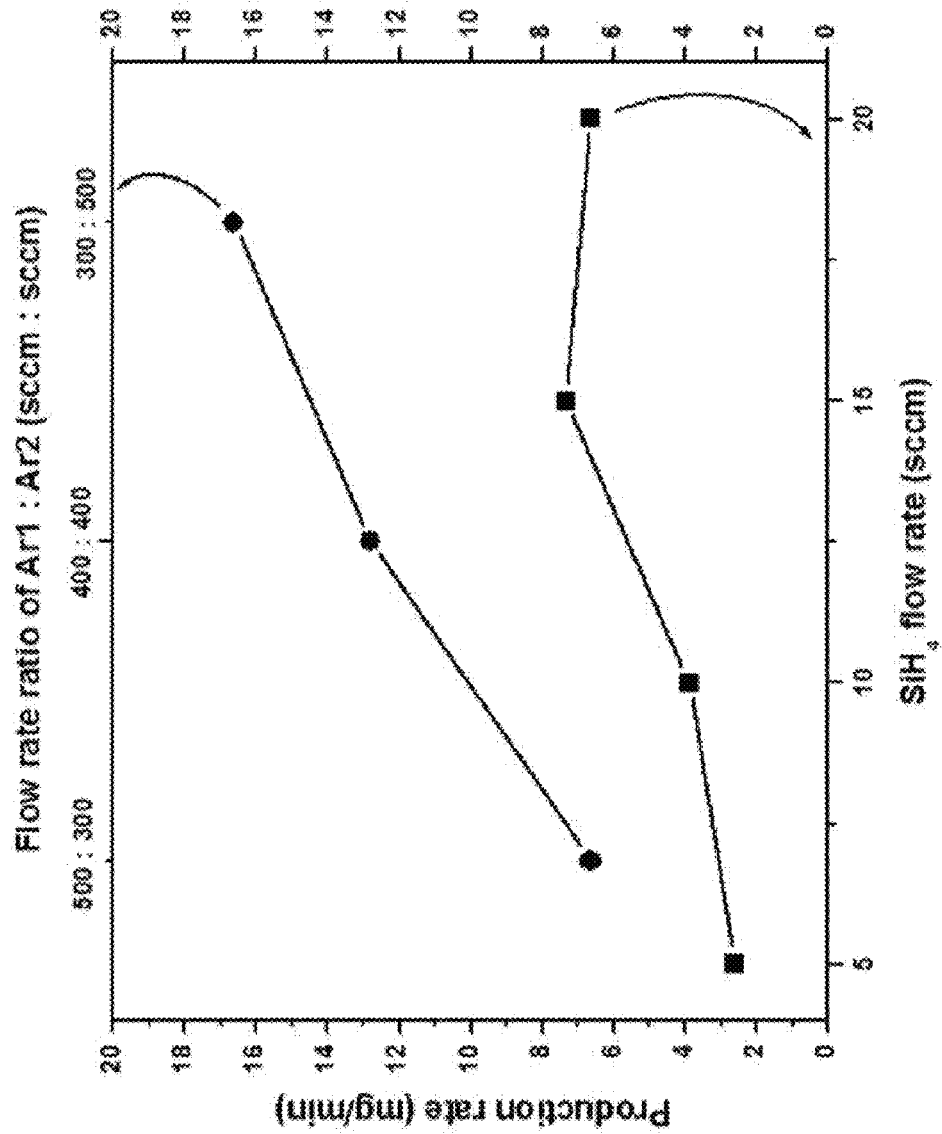

APPARATUS FOR PRODUCING SILICON NANOPARTICLE USING INDUCTIVE COUPLED PLASMA

CROSS-REFERENCE TO RELATED APPLICATION

This application is a U.S. National Phase Application of PCT International Application No. PCT/KR2013/010729 filed on Nov. 25, 2013, which is hereby incorporated by reference in its entirety into this application.

TECHNICAL FIELD

The present invention relates to an apparatus for producing silicon nanoparticles using ICP (Inductive Coupled Plasma). More particularly, the present invention relates to an apparatus for producing silicon nanoparticles in which a homogeneous gas reaction region is provided so as to increase a plasma density, thus making it easy to control the grain size of the silicon nanoparticles and improving the production yield.

BACKGROUND ART

Recently, silicon nanocrystals have been widely used as photoelectric conversion/photo conversion materials used in, for example, solar cells or light emitting devices (LEDs). Of various methods for preparing silicon nanoparticles, a vapor state reaction is advantageous for grain size control of highly pure silicon nanoparticles and utilizes mainly laser or thermal plasma. With such an energy source, however, the silicon nanoparticles are apt to aggregate, due to high calorific heat, into secondary particles having a size of several micrometers ($\mu$m).

As a solution to such problems, low-temperature plasma such as inductively coupled plasma (ICP) has recently been used to prevent the aggregation of silicon nanocrystals.

A conventional ICP-based apparatus for producing silicon nanoparticles has a structure in which a reactor is wound with an ICP coil around the outer circumference thereof and is simultaneously supplied with a first gas for the formation of silicon nanoparticles and a second gas for the surface reaction of silicon nanoparticles.

For such a conventional ICP-based apparatus, however, a wide plasma reaction area is caused by plasma diffusion inside the reactor, resulting in making it difficult to control the grain size of the silicon nanoparticles. The plasma diffusion also causes a wide reaction area of the second gas, and extends reaction time, thereby making it difficult to control the grain size of silicon nanoparticles and lowering the production yield.

Therefore, there is a need for an apparatus for producing silicon nanoparticles using ICP (Inductive Coupled Plasma) that can facilitate the control of the grain size of silicon nanoparticles by making the plasma reaction uniform across the inside of the reactor and that can increase the production yield through the maximization of reaction efficiency by forming a high density of plasma.

DISCLOSURE

Technical Problem

It is therefore an object of the present invention to provide an apparatus for producing silicon nanoparticles in a vapor state reaction manner using ICP (Inductive Coupled Plasma) that can make it easy to control the grain size of the silicon nanoparticles by generating a plasma reaction uniform across the inside of a reactor and which is improved in production yield by forming a high density of plasma through position adjustment of a feeding pipe of the first gas.

Technical Solution

In order to accomplish the above object, the present invention provides an apparatus for producing silicon nanoparticles, comprising a plasma reactor including: a gas supply part at an inlet of the reactor, a plasma reaction part with an ICP coil wound around the outer wall thereof, a cooling part for cooling produced silicon nanoparticles, and a collection part for collecting particles captured by mesh filters, wherein a plurality of first gas pipes for introducing first gas into the plasma reactor therethrough and a plurality of second gas pipes for introducing second gas into the plasma reactor therethrough are arranged in an alternative pattern in the gas supply part, the first gas supply pipes extending from an inlet of the reactor to a plasma initiation region within the reactor, and wherein a cooling gas is introduced into the cooling part through a nozzle.

Advantageous Effects

Having the structure in which the first gas supply pipes are extended to the plasma initiation region corresponding to the uppermost area of the plasma reaction part and the second gas supply pipes are distal from the plasma reaction part while the supply pipes are arranged in an alternative pattern, the apparatus of the present invention can sufficiently mix the gases introduced through the first gas supply pipes, thus allowing for the uniform plasma reaction between the first and the second gas in the plasma reaction region, minimizing plasma expansion to increase the plasma density within a short retention time, easily controlling the grain size distribution of nanoparticles by capturing silicon nanoparticles in a quenching manner, and improving the production yield by preventing the secondary aggregation of particles with cooling gas.

DESCRIPTION OF DRAWINGS

FIG. 2 is a table illustrating the silicon nanoparticle producing apparatus of FIG. 1.

FIG. 11 is a graph in which production rates of the silicon nanoparticles are plotted against the flow rate of silane and the flow rate ratio of inert gas (Ar).

BEST MODE

Embodiments of the present invention are described with reference to the accompanying drawings in order to describe the present invention in detail so that those having ordinary knowledge in the technical field to which the present invention pertains can easily practice the present invention.

Figure 1:
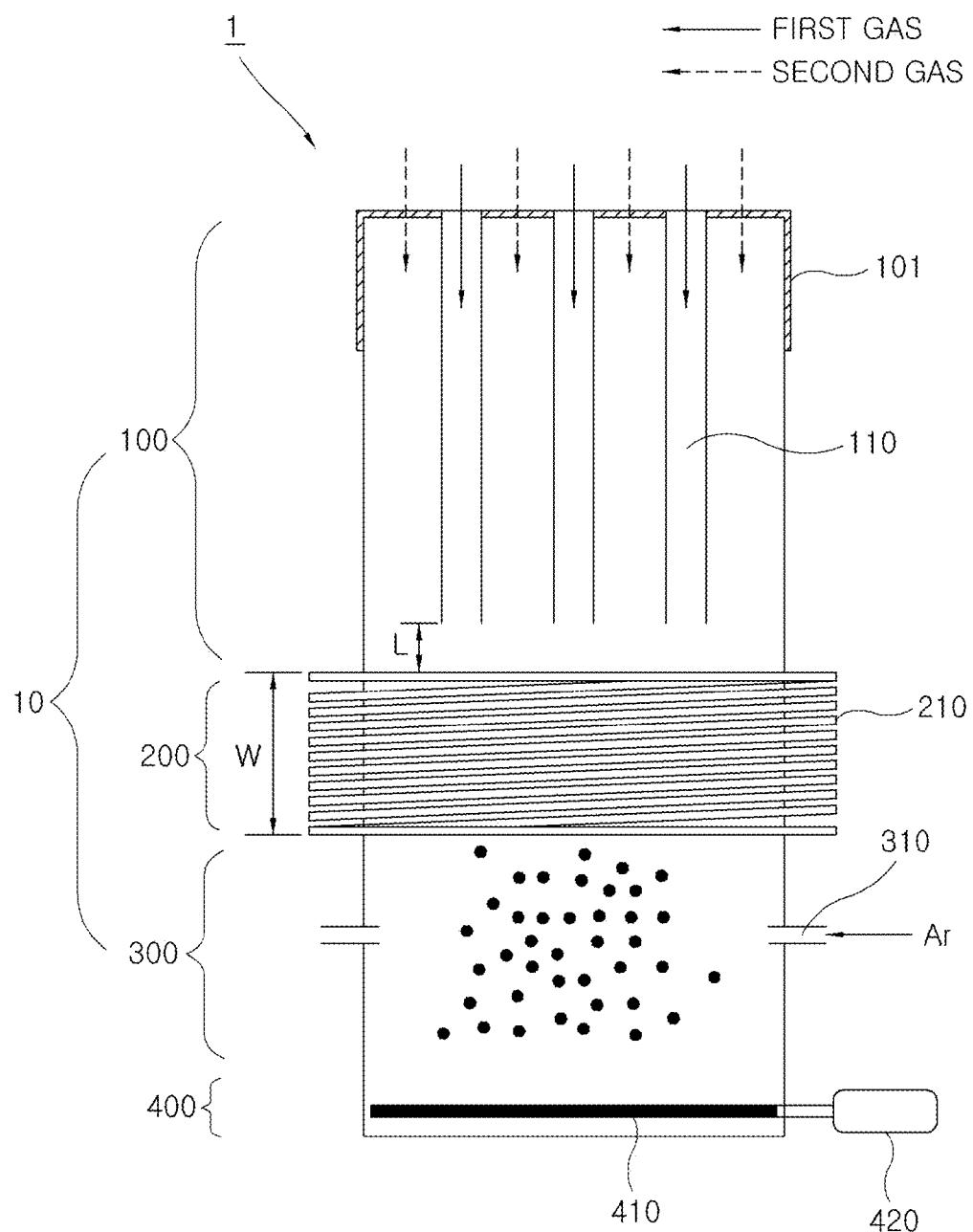
FIG. 1 is an apparatus for producing silicon nanoparticles in accordance with the present invention.

FIG. 1 is a schematic view illustrating an apparatus for producing silicon nanoparticles according to one exemplary embodiment of the present invention. Referring to FIG. 1, the apparatus 1 for producing silicon nanoparticles according to one exemplary embodiment of the present invention comprises a gas supply part 100 at an inlet of a plasma reactor 10, a plasma reaction part 200 with an ICP coil wound around the outer wall thereof, a cooling part 300 for cooling produced silicon nanoparticles, and a collection part 400 for collecting particles captured by mesh filters.

In the gas supply part, first, several first gas supply pipes 110 and several second gas supply pipes 111 are arranged in an alternative pattern at the top of the reactor and fixed on the inner side of a cover plate 101. The first gas supply pipes 110 extend to a top of the plasma reaction part 200. Configured to form silicon nanoparticles, the first gas may include a precursor gas such as silane (SiH4), and an inert gas as a carrier, for example, argon (Ar). The second gas is supplied to treat the surface of the produced silicon nanoparticles. Hydrogen (H2) may be used as the second gas, with the accompaniment of an inert gas for carrying hydrogen gas, such as argon (Ar). For surface doping of the produced silicon nanoparticles, boron (B)-containing gas may be used in the first and the second gas. For use in surface doping, B2H6 or PH3 may be accounted. In contrast to the first gas supply pipes 110, which extend to the top of the plasma reaction part 200, the second gas supply pipes 111 may not be terminated at a definite position. In order to sufficiently mix the second gases introduced therethrough, the second gas supply pipes 11 may run parallel to, but shorter than the first gas supply pipes 110. When the second gas that sufficiently mixes by itself due to this structure reacts with the first gas, not only can the reaction area and time be minimized, but also the plasma diffusion is reduced due to the minimized area, allowing the plasma reaction between the first and the second gas to occur uniformly at a high density.

FIG. 2 is a table illustrating the silicon nanoparticle producing apparatus of FIG. 1. As is understood from the data, good plasma formation can be acquired under the condition of about $0 \leq L/W \leq 0.3$ wherein L is a distance from the inlet of the first gas supply pipe 110 to the IPC coil 210 and W is the width of the coil in the axial direction.

Figure 3:
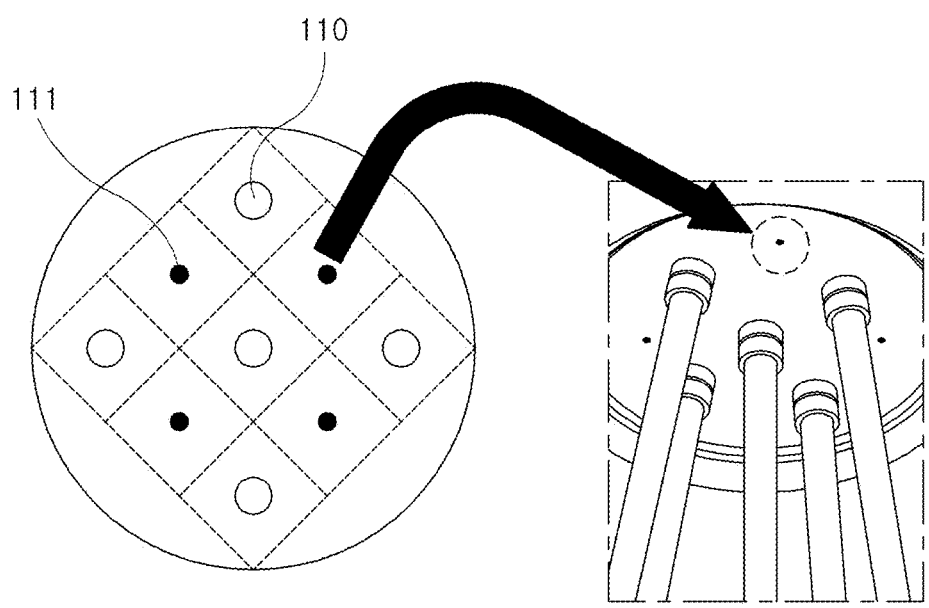
FIG. 3 shows the arrangement of gas supply pipes in the gas supply part.
Figure 4:
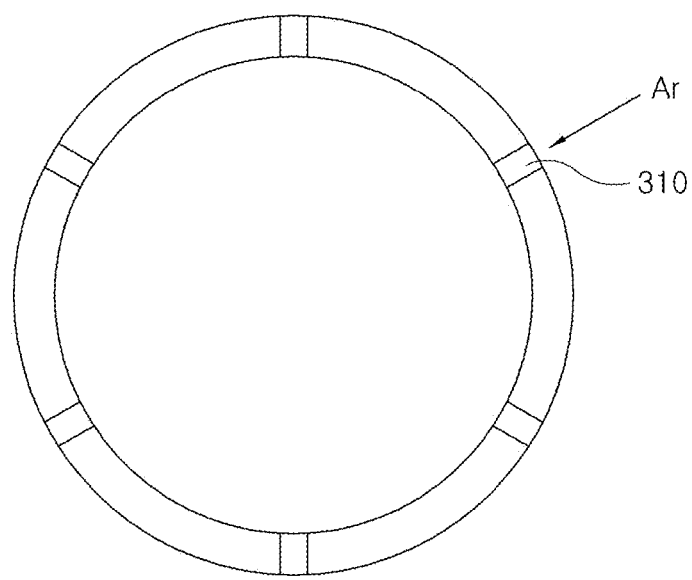
FIG. 4 is a schematic view of the cooling nozzles radially inserted.

FIG. 3 is a cross-sectional view illustrating the arrangement of the first gas supply pipes 110 and the second gas supply pipes 111 in the gas supply part 110, with a partially specific illustration given in an insert. As can be seen, the first gas supply pipes 110 and the second gas supply pipes 111 are arranged in an alternative pattern. In detail, one second gas supply pipe 111 is located at each of left, right, upper and lower positions of one first gas supply pipe 110 while one first gas supply pipe 110 is located at each of left, right, upper and lower positions of one second gas supply pipes 111. Within a regular rectangle occupying a central point of the gas supply part, the supply pipes may be arranged at regular spaces in a matrix pattern of N×N (N≥3).

The supply pipes may be of a tube type with various cross sections including, but not limited to, circles, rectangles, triangles, etc.

Returning to FIG. 1, an ICP coil 210 is wound around the outer wall of the plasma reaction part 200. The plasma induced by the ICP coil facilitates a reaction between the first and the second gas to form silicon nanoparticles. For the ICP plasma reaction, the reactor may be operated at a pressure of about 0.1-10 torr with a frequency of 13.56 MHz applied thereto. The operation voltage and the application frequency may vary according to the flow rate of the first and the second gas.

Structured to introduce inert gas through a nozzle thereinto, the cooling part 300, located beneath the plasma reaction part, functions to quench the silicon nanoparticles produced during the passage of the plasma reaction part, and to prevent the aggregation of the silicon nanoparticles. In greater detail, a cooling nozzle 310 is provided in a direction perpendicular to the axis of the reactor and radially along the outer circumference of the reactor. Through the cooling nozzle, argon (Ar) gas is introduced into the cooling part 300 of the reactor from an external side. In one exemplary embodiment, six cooling nozzles may be radially installed. However, no limitations are imparted to the number and angle of the nozzle. Preferably, the gas supply part, the plasma reaction part, and the cooling part are made of quartz because of its thermal stability.

Figure 5A:
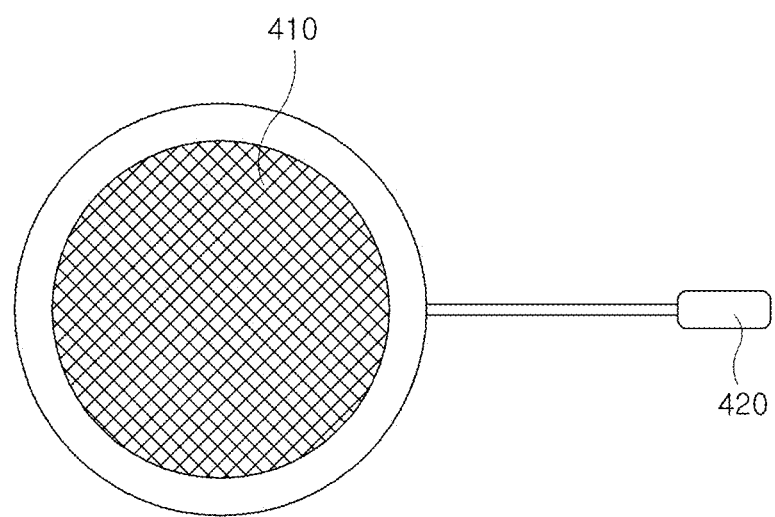
FIGS. 5A and 5B illustrate a particle collection part.
Figure 5B:
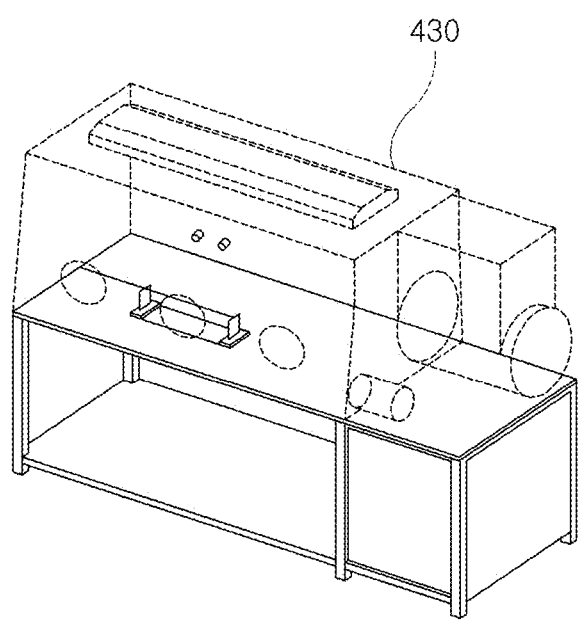

With reference to FIGS. 5A and 5B, the silicon nanoparticles that pass through the cooling part 300 are captured by a mesh filter 410 in a collection part 400 occupying the lower portion of the reactor. Additional collection devices that allow the mesh filter to be brought out of the reactor as needed after completion of all the reactions may be provided, including a capture holder 420, and a glove box 430 filled with a nitrogen atmosphere.

Figure 6A:
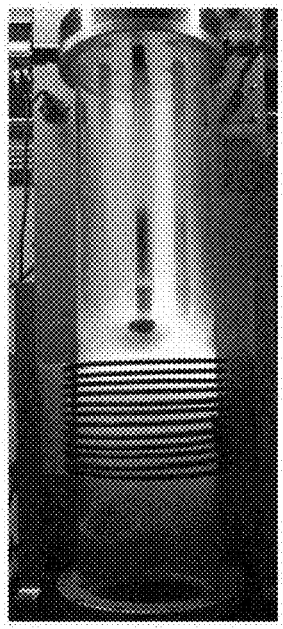
FIGS. 6A, 6B and 6C show various plasma patterns generated using ICP.
Figure 6B:
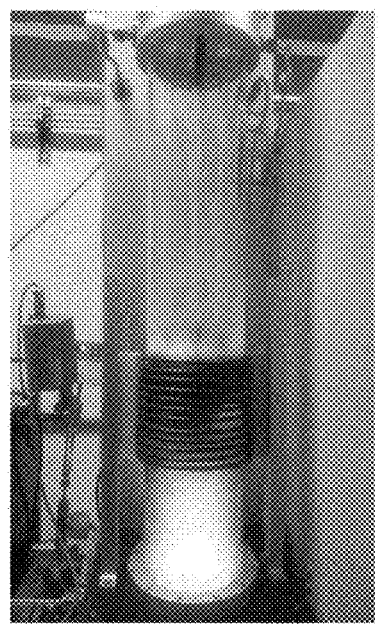
Figure 6C:
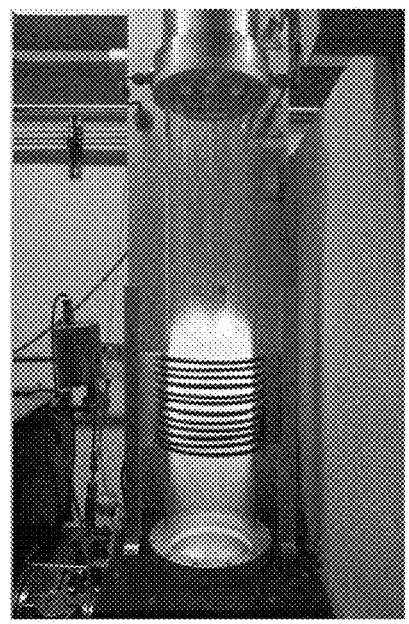
Figure 7A:
FIGS. 7A, 7B, 7C, and 7D show photographs of various silicon nanoparticles produced.
Figure 7B:
Figure 7C:
Figure 7D:

Turning now to FIGS. 6A, 6b and 6C, the plasma shape appears in quite different patterns depending on process conditions. The first gas and the second gas are fed into the plasma reactor through respective supply pipes, that is, the first gas supply pipes and the second gas supply pipes that are alternately arranged in the gas supply part. The first gas supply pipes extend from the gas inlet to the plasma reaction part whereas the second gas supply pipes do not extend. FIGS. 6A and 6B show plasma patterns that are formed when the first gas supply pipes 110 do not reach, or pass through a plasma initiation region in the vicinity of the ICP coil 210, respectively. When the pipes are extended to the plasma initiation region, as shown in FIG. 6C, plasma is concentrated around the ICP coil-wound area. Herein, the term "plasma initiation region" refers to a region at which a plasma reaction starts to be induced by the ICP coil and which corresponds to the end of the first gas supply pipes. This region may vary depending on the feeding speed and amount of the first and the second gas and the voltage applied to the ICP coil. The plasma pattern has an influence on a grain size distribution of the produced silicon nanoparticles. When the plasma initiation region is constructed above the ICP coil as shown in FIG. 6A, the particle size is too heterogeneous to form crystalline silicon. The plasma initiation region located below the ICP coil, as shown in FIG. 6B, causes the silicon nanoparticles captured by the mesh filter 410 to undergo re-sputtering, which leads to a decrease in production yield. The concentration of plasma in the central region of the ICP coil, as shown in FIG. 6C, imparts uniform particle sizes and crystallinity on the produced silicon nanoparticles. FIGS. 7A, 7B, 7C, and 7D show photographs of the produced silicon nanoparticles. That is, FIGS. 7A and 7B are photographs of crystalline nanoparticles and FIGS. 7C and 7D are photographs of amorphous nanoparticles, the latter being produced in accordance with the present invention.

Figure 8:
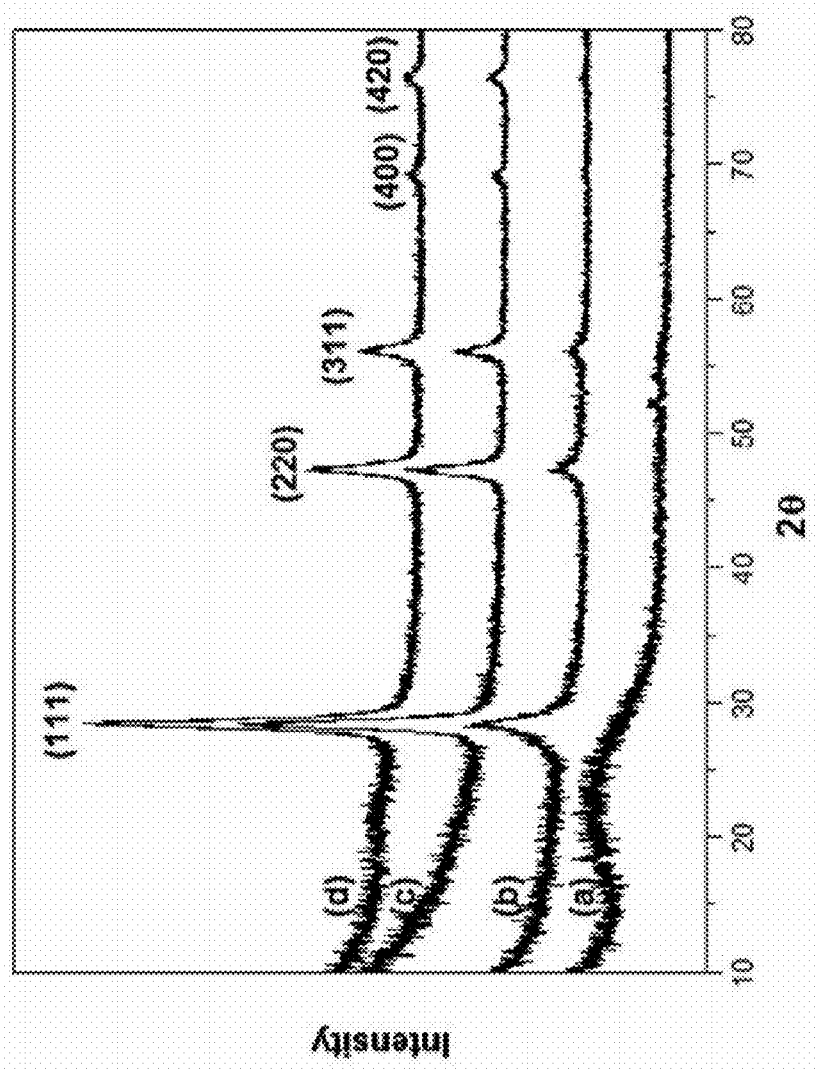
FIG. 8 shows XRD spectra of the silicon nanoparticles produced with the application of various electric powers thereto.

FIG. 8 shows XRD spectra of the silicon nanoparticles produced by the apparatus of the present invention with the application of various electric powers thereto. As can be seen in FIG. 8(*a*), the application of 100 watts allows for the production of pure amorphous silicon nanoparticles. As the electric power increases to 200 watts (FIG. 8(*b*)), 300 watts (FIGS. 8(*c*)) and 400 watts (FIG. 8(*d*)), the silicon nanoparticles are found to increase in crystallinity. That is, the apparatus of the present invention can produce silicon nanoparticles with various crystalline structures from an amorphous structure to high crystallinity. Further, the apparatus of the present invention is not limited to the production of silicon particles, but has applications in the production of highly crystalline nanoparticles of various materials introduced as gases.

Figure 9:
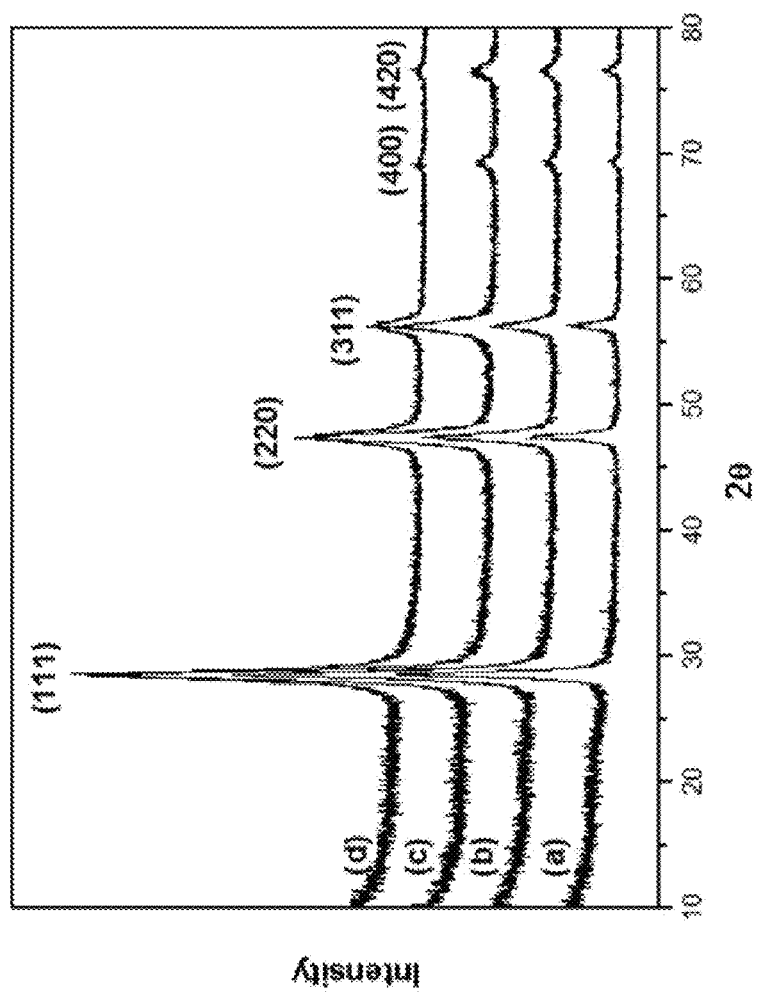
FIG. 9 shows XRD spectra of silicon nanoparticles according to the flow rate of the silane.
Figure 10A:
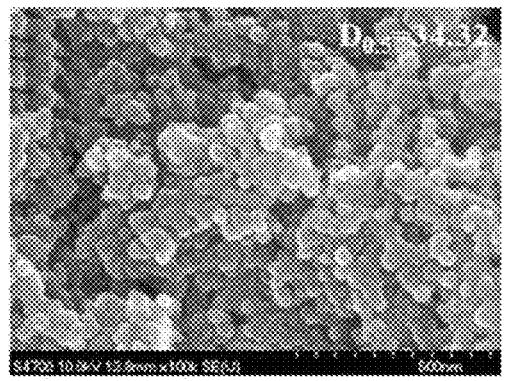
FIGS. 10A, 10B, 10C, and 10D show SEM images of the produced silicon nanoparticles according to the flow rate of silane.
Figure 10B:
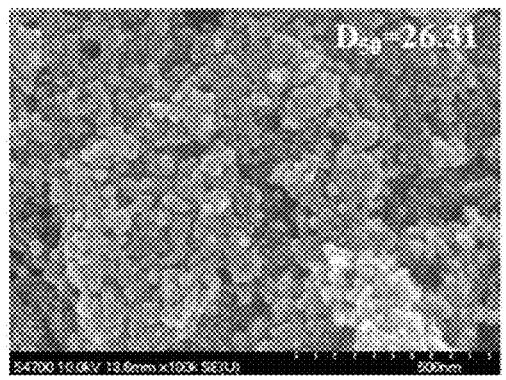
Figure 10C:
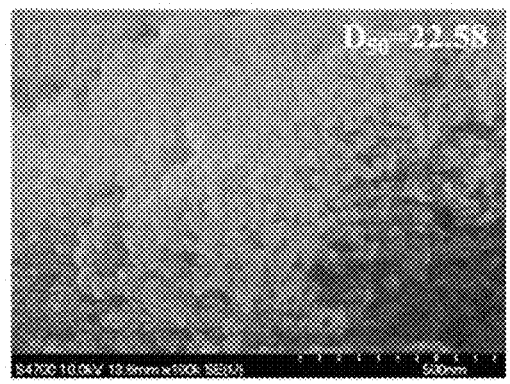
Figure 10D:
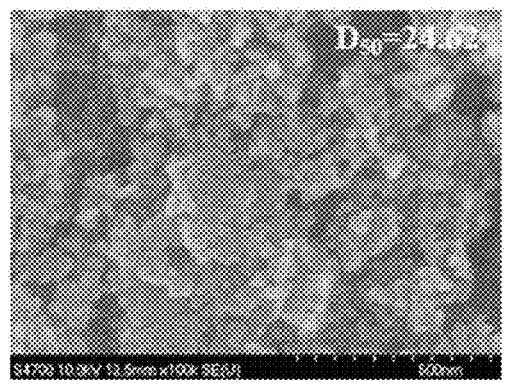

FIG. 9 shows XRD spectra of silicon nanoparticles according to the flow rate of the silane (SiH4) that passes through the gas supply part. As can be seen, silicon nanoparticles are more uniform in crystallinity with an increase in the flow rate of silane from 5 (a) to 10 (b), 15 (c) and 20 sccm (d) while a power of 300 watts is applied. Consequently, the crystallinity of the produced silicon nanoparticles is determined by the power applied to the apparatus and the flow rate of silane. Using this advantage, the grain size and production yield of the nanoparticles is possible to control while the crystallinity of the nanoparticles is maintained. FIGS. 10A, 10B, 10C, and 10D show SEM images of the produced silicon nanoparticles according to the flow rate of silane (the same conditions as in FIG. 9). As can be seen, uniform particle size distributions are observed in the nanoparticles while the particle size decreases with an increase in the flow rate of silane. In the present invention, the particle size of the nanoparticles can be controlled to the degree of 7 nm~100 nm.

FIG. 11 is a graph in which production rates of the silicon nanoparticles are plotted against the flow rate of silane and the flow rate ratio between argon gases introduced through the first and the second gas supply pipes. As is understood from the data, the production rate increases with an increase in the flow rate of silane, and also with an increase in the partial ratio of argon gas when the flow rate of total gas is constant. This is because the amount of silane that is deposited on the wall of the plasma reactor is decreased with an increase in the partial ratio of argon gas.

As a rule, an increase in the retention time of plasma decreases the plasma density and causes a non-uniform plasma distribution. Configured to adjust the plasma area critically responsible for the grain size control of silicon nanoparticles, the apparatus for producing silicon nanoparticles in accordance with the present invention can minimize plasma expansion. Further, having the structure in which the first gas supply pipes 110 are extended to the plasma initiation region corresponding to the uppermost area of the plasma reaction part and the second gas supply pipes 111 are distal from the plasma reaction part while the supply pipes are arranged in an alternative pattern as shown in FIG. 3, the apparatus of the present invention enjoys the advantage of sufficiently mixing the gases introduced through the first gas supply pipes, allowing for the uniform plasma reaction between the first and the second gas in the plasma reaction region, minimizing plasma expansion to increase the plasma density within a short retention time, easily controlling the grain size distribution of nanoparticles by capturing silicon nanoparticles in a quenching manner, and improving the production yield by preventing the secondary aggregation of particles with cooling gas.

Meanwhile, the present invention is not limited to the above-described embodiments and may be changed and modified, without departing from the gist of the present invention, and it should be understood that the technical spirit of such changes and modifications also belong to the scope of the accompanying claims.

The invention claimed is:

1. An apparatus for producing silicon nanoparticles, comprising:
    a plasma reactor including a gas supply part in which a plurality of first gas pipes for introducing a first gas into the plasma reactor therethrough and a plurality of second gas pipes for introducing a second gas into the plasma reactor therethrough are arranged in an alternative pattern, wherein the first gas supply pipes are extended from an inlet of the reactor to a plasma initiation region within the plasma reactor and the second gas supply pipes are not extended to the plasma initiation region, and a plasma reaction part having an ICP coil wound around an outer wall thereof in which the silicon particles are formed as the gases introduced through the respective pipes are subjected to a plasma reaction; and
    a collection part for collecting the silicon particles,
    wherein the plurality of first gas pipes and the plurality of second gas pipes are arranged in an alternative pattern, the plurality of second gas pipes are displaced in parallel with the plurality of first gas pipes, the plurality of second gas pipes are shorter than the plurality of first gas pipes so that a plasma reaction between the first and the second gas occurs uniformly at a high density.

2. The apparatus of claim 1, wherein the first gas supply pipes and the second gas supply pipes are arranged in the alternative pattern in such a way that one of the second gas supply pipes is located at each of left, right, upper and lower positions of one of the first gas supply pipes while one of the first gas supply pipes is located at each of left, right, upper and lower positions of one of the second gas supply pipes.

3. The apparatus of claim 2, wherein the first gas supply pipes and the second gas supply pipes are arranged at regular spaces in a matrix pattern of N×N (N≥3) within a regular rectangle occupying a central point of the gas supply part.

4. The apparatus of claim 3, wherein the plasma is formed under the following condition:
    about $0 \leq L/W \leq 0.3$
    Wherein
    L is a distance from the inlet of the first gas supply pipe to the IPC coil; and
    W is the width of the coil in an axial direction.

5. The apparatus of claim 4, wherein the plasma formation in the plasma reaction part is carried out at a pressure about of 0.1-10 torr with a radio frequency (RF) of 13.56 MHz applied the ICP coil.

6. The apparatus of claim 4, wherein the first gas supply pipes and the second gas supply pipes are of tube type with a cross section selected from among a circle, a rectangle, and a triangle.

7. The apparatus of claim 4, wherein the reactor further include a cooling part beneath of the plasma reaction part, the cooling part being configured to introduce external inert gas through a plurality of cooling nozzles that are provided radially along an outer circumference of the reactor.

8. The apparatus of claim 7, wherein the cooling part is located on the collection part for collecting the silicon particles, the collection part being equipped with a mesh filter at a lower portion thereof and cooling and capturing the silicon particles produced by a plasma reaction between the first gas and the second gas.

9. The apparatus of claim 3, wherein the first gas includes silane (SiH4) and an inert gas.

10. The apparatus of claim 3, wherein the second gas includes hydrogen (H2) and an inert gas.

11. The apparatus of claim 3, wherein the first gas and the second gas further include either or both of B2H6 and PH3 for doping.

12. The apparatus of claim 3, wherein the plasma reactor further includes a cooling part beneath of the plasma reaction part, wherein the cooling part is configured to introduce external inert gas through a plurality of cooling nozzles that are provided radially along an outer circumference of the reactor, and wherein the collection part for collecting the silicon particles is located beneath the cooling part, and equipped with a mesh filter at a lower portion thereof and functions to cool and capture the silicon particles produced by a plasma reaction between the first gas and the second gas.

13. A silicon nanoparticle, produced by the apparatus of claim 1, ranging in diameter from 7 nm to 100 nm.

* * * * *